US012625797B2

(12) United States Patent
Liou et al.

(10) Patent No.: US 12,625,797 B2
(45) Date of Patent: May 12, 2026

(54) MULTIPLE TELECOMMUNICATION ENDPOINTS SYSTEM AND TESTING METHOD THEREOF BASED ON AI DECISION

(71) Applicant: National Yang Ming Chiao Tung University, Hsinchu City (TW)

(72) Inventors: En-Cheng Liou, Hsinchu City (TW); Ta-Sung Lee, Hsinchu City (TW); Kai-Ten Feng, Taipei City (TW); Yu-Chien Lin, New Taipei City (TW); Chia-Hung Lin, Tainan City (TW)

(73) Assignee: National Yang Ming Chiao Tung University, Hsinchu City (TW)

( * ) Notice: Subject to any disclaimer, the term of this patent is extended or adjusted under 35 U.S.C. 154(b) by 1317 days.

(21) Appl. No.: 17/444,477

(22) Filed: Aug. 4, 2021

(65) Prior Publication Data

US 2022/0066919 A1 Mar. 3, 2022

(30) Foreign Application Priority Data

Sep. 3, 2020 (TW) ................................. 109130297

(51) Int. Cl.
*G06F 11/3668* (2025.01)
*G06F 11/22* (2006.01)
(Continued)

(52) U.S. Cl.
CPC ...... *G06F 11/3692* (2013.01); *G06F 11/2273* (2013.01); *G06F 11/3457* (2013.01);
(Continued)

(58) Field of Classification Search
CPC ............. G06F 11/3692; G06F 11/2273; G06F 11/3457; G06F 11/3684; G06F 11/3688;
(Continued)

(56) References Cited

U.S. PATENT DOCUMENTS

| | | | |
|---|---|---|---|
| 10,237,098 B2 | 3/2019 | Kossel | |
| 10,244,392 B2 | 3/2019 | Caracas et al. | |

(Continued)

FOREIGN PATENT DOCUMENTS

| | | |
|---|---|---|
| CN | 102185664 B | 12/2013 |
| CN | 107229693 A | 10/2017 |

(Continued)

OTHER PUBLICATIONS

Pan, R., Tao, J., Su, Y., Zhou, D., Zeng, X. and Li, X., 2019. Analog/RF post-silicon tuning via Bayesian optimization. ACM Transactions on Design Automation of Electronic Systems (TODAES), 25(1), pp. 1-17.*

*Primary Examiner* — Zhitong Chen
(74) *Attorney, Agent, or Firm* — CKC & Partners Co., LLC

(57) ABSTRACT

An AI decision based multiple telecommunication endpoints system is provided, including a telecommunication endpoint device and an artificial intelligence decision controller. The telecommunication endpoint device performs a communication test with the radio frequency communication device under test. The artificial intelligence decision controller is electrically connected to the telecommunication terminal device to control the communication test, and performs an efficiency analysis on the result of the communication test, and generates a decision instruction according to the result of the efficiency analysis. The artificial intelligence decision controller can centrally control, replace and analyze multiple artificial intelligence modules and generate a large number of telecommunication endpoints device signal sending and receiving behaviors, providing a telecommunication endpoints system with self-adaptive adjustment process, parameters, result analysis and reasonable cost as a test for the development phase, deployment phase, or maintenance (Continued)

AI decision based multiple telecommunication endpoint system
10

AI decision controller
100 telecommunication endpoint device
200 communication test

RF communication device under test
300 phase of the telecommunications equipment product development process.

16 Claims, 5 Drawing Sheets

(51) Int. Cl.

| | | |
|---|---|---|
| *G06F 11/34* | (2006.01) | |
| *G06F 18/214* | (2023.01) | |
| *G06N 20/00* | (2019.01) | |

(52) U.S. Cl.
CPC ...... *G06F 11/3684* (2013.01); *G06F 11/3688* (2013.01); *G06F 18/214* (2023.01); *G06N 20/00* (2019.01)

(58) Field of Classification Search
CPC ..... G06F 18/214; G06F 11/261; G06N 20/00; G06V 10/774; G06V 10/776; H04W 24/02; H04W 24/06
See application file for complete search history.

(56) References Cited

U.S. PATENT DOCUMENTS

| | | | | |
|---|---|---|---|---|
| 10,256,930 | B2 | 4/2019 | Karajani et al. | |
| 10,356,597 | B2 | 7/2019 | Prasad et al. | |
| 2017/0324617 | A1* | 11/2017 | Prasad ................. | H04W 24/02 |
| 2019/0059107 | A1 | 2/2019 | Inoki et al. | |
| 2019/0250242 | A1 | 8/2019 | Lawitzky | |
| 2019/0340512 | A1 | 11/2019 | Vidal et al. | |
| 2021/0073110 | A1* | 3/2021 | Vidal .................... | G06N 3/006 |

FOREIGN PATENT DOCUMENTS

| | | | |
|---|---|---|---|
| CN | 107258101 | A | 10/2017 |
| JP | 6199573 | B2 | 9/2017 |
| JP | 6444328 | B2 | 12/2018 |
| JP | 6495843 | B2 | 4/2019 |
| TW | I345162 | B | 7/2011 |
| TW | I551068 | B | 9/2016 |
| TW | I578727 | B | 4/2017 |

* cited by examiner

MULTIPLE TELECOMMUNICATION ENDPOINTS SYSTEM AND TESTING METHOD THEREOF BASED ON AI DECISION

CROSS-REFERENCE TO RELATED APPLICATION

This application claims priority to Taiwan Application Serial Number 109130297, filed Sep. 3, 2020, which is herein incorporated by reference in its entirety.

BACKGROUND

Field of Invention

The present invention relates to a multiple telecommunication system and a testing method thereof. More particularly, the multiple telecommunication system and the testing method of present invention are based on an artificial intelligence decision.

Description of Related Art

The cost of the test equipment for testing current mobile network remains high, and the conventional test equipment is difficult to integrate different test since it mainly focuses on a single function. For example, channel emulator for performing channel simulation on a single mobile terminal device or wireless signal does not discuss simulation of multiple mobile terminal systems, or using components such as an anechoic chamber to generate and synthesize channel analog signals does not discuss the integration of multiple terminal device systems with AI modules. Moreover, when testing a wireless device or a single base station, the common system under test of the overall base station and core network is ignored. Further, signals which are generated by a test system are often generated by a single signal source and then transmitted to multiple radio frequency elements. This does not discuss centralized definition of control signals, and then generate test signal as a main mode.

According to above descriptions, the problems which exist in conventional technologies can be summarized into three categories. The first problem is that during the development and verification of mobile communication systems, the test equipment can only deploy a single device since traditional test systems and tools are designed and developed mainly for hardware. However, there is a huge difference in the number of users of the telecommunication system in actual commercial use, so the cost of the research and development stage remains high, or it is unable to provide a large number of research and development verification at the research and development stage, and usually rely on manpower to control and manage the test methods.

The second problem is that at the equipment development or introduction stage, a lot of testing tools and testing personnel are required in laboratory testing and field testing, so errors will inevitably be caused by humans in the operation, management problems will happen, and results that are sufficient verifiable or quick adjustment may not always be obtained.

The third problem is that when the mobile communication system develops telecommunications public or private network application services, the functional problems are usually eliminated, and the stability of performance, the experience of application quality, and the impact on existing network services still need to evaluate. It is difficult for the telecommunications network service industry to use existing testing tools and services to directly simulate and confirm the effectiveness of the development of relevant new-type application services and the feasibility of introduction and evaluation.

SUMMARY

The present disclosure provides multiple telecommunication endpoint system based on artificial intelligence (AI) decision, providing a set of highly intelligent multiple telecommunication endpoint system solutions for the mobile communication industry supply chain. The multiple telecommunication endpoint system solutions can simulate behavior of connecting with a large number of user signals by using multiple AI modules which can be replaced and controlled centralized in the same environment.

Specifically, the present disclosure provides an artificial intelligence (AI) decision controller which comprises a telecommunication endpoint simulator, a plurality of AI modules, a data analysis unit, a decision unit, and a main controller. The telecommunication endpoint simulator is configured to set a test environment parameter of a telecommunication endpoint device and generates a test signal corresponding to the test environment parameter. The AI modules comprise a configuration of a recommendation AI module and a backup AI module, the configuration corresponding to the test environment parameter. Each of the AI modules generates a prediction signal corresponding to the test environment parameter respectively. The data analysis unit, being configured to perform an efficiency analysis on a result of a communication test by comparing a feedback signal and each of the prediction signal. The communication test is performed by the telecommunication endpoint device and at least one radio frequency (RF) communication device under test. The prediction signal corresponding to the configuration, and the feedback signal is transmitted by the at least one RF communication device under test. The decision unit is configured to generate a decision instruction according to a difference value of each of the prediction signal and the feedback signal so as to adjust the configuration. The main controller is electrically connected to the telecommunication endpoint simulator, the AI modules, the data analysis unit, and the decision unit.

According to an embodiment of the present disclosure, at least one of the telecommunication endpoint simulator, the AI modules, data analysis unit, decision unit, and main controller is implemented by a processor.

According to an embodiment of the present disclosure, the telecommunication endpoint device is one of a user equipment, an internet of things (IoT) device, a software radio device, and a system platform for transmitting a RF signal.

According to an embodiment of the present disclosure, the telecommunication endpoint device comprises a control device, a transmission interface, a telecommunication signal module, a channel emulator, and an antenna.

According to an embodiment of the present disclosure, the test environment parameter of the telecommunication endpoint device comprises at least a time synchronization signal and a location signal.

According to an embodiment of the present disclosure, the decision instruction, generated by the decision unit, comprises a weight value for adjusting the AI modules.

According to an embodiment of the present disclosure, when the difference value of the recommendation AI module is less than a threshold value, the data analysis unit maintains the configuration.

According to an embodiment of the present disclosure, when the difference value of the recommendation AI module is greater than a threshold value and the difference value of the backup AI module is less than the threshold value, the data analysis unit increases the weight value of the backup AI module through the decision instruction.

According to an embodiment of the present disclosure, when the difference value of the recommendation AI module is greater than a threshold value and less than the difference value of the backup AI module, the main controller performs a machine learning training or a deep learning training on the recommendation AI module by transmitting the feedback signal.

Furthermore, the present disclosure provides a telecommunication endpoint device which comprises a transmission interface, a channel emulator, a telecommunication signal module, an antenna, and a control device. The control device is configured to execute the following operations: generating a test signal corresponding to a test environment parameter which is set by an artificial intelligence (AI) decision controller via the telecommunication signal module; transmitting the test signal to at least one radio frequency (RF) communication device under test via the antenna to perform a communication test with the at least one RF communication device under test; receiving a feedback signal from the at least one RF communication device under test via the antenna; transmitting the feedback signal to the AI decision controller via the transmission interface to make the AI decision controller perform an efficiency analysis on a result of the communication test.

According to an embodiment of the present disclosure, the telecommunication signal module is implemented by a processor.

According to an embodiment of the present disclosure, the telecommunication endpoint device is one of a user equipment, an internet of things (IoT) device, a software radio device, and a system platform for transmitting a RF signal.

According to an embodiment of the present disclosure, the test environment parameter of the telecommunication endpoint device comprises at least a time synchronization signal and a location signal.

In addition, the present disclosure provides an AI decision based multiple telecommunication endpoints system which comprises a telecommunication endpoint device and an AI decision controller. The telecommunication endpoint device is configured to perform a communication test with the at least one RF communication device under test. The AI decision controller is electrically connected to the telecommunication endpoint device to control the communication test, perform an efficiency analysis on a result of the communication test, and generate a decision instruction according to a result of the efficiency analysis. The AI decision controller comprises a telecommunication endpoint simulator, a plurality of AI modules, a data analysis unit, a decision unit, and a main controller. The telecommunication endpoint simulator is configured to set a test environment parameter of a telecommunication endpoint device. The telecommunication endpoint device generates a test signal corresponds to the test environment parameter. The AI modules comprise a configuration of a recommendation AI module and a backup AI module, and the configuration corresponds to the test environment parameter. Each of the AI modules generates a prediction signal corresponding to the test environment parameter respectively. The data analysis unit is configured to perform the efficiency analysis by comparing a feedback signal and each of the prediction signal. The decision unit is configured to generate the decision instruction according to a difference value of each of the prediction signal and the feedback signal so as to adjust the configuration. The main controller is electrically connected to the telecommunication endpoint simulator, the AI modules, the data analysis unit, and the decision unit.

According to an embodiment of the present disclosure, the at least one of the telecommunication endpoint simulator, the AI modules, the data analysis unit, the decision unit, and the main controller is implemented by a processor.

According to an embodiment of the present disclosure, the test environment parameter of the telecommunication endpoint device comprises at least a time synchronization signal and a location signal.

According to an embodiment of the present disclosure, the decision instruction, generated by the decision unit, comprises a weight value for adjusting the AI modules.

According to an embodiment of the present disclosure, when the difference value of the recommendation AI module is less than a threshold value, the data analysis unit maintains the configuration.

According to an embodiment of the present disclosure, when the difference value of the recommendation AI module is greater than a threshold value and the difference value of the backup AI module is less than the threshold value, the data analysis unit increases the weight value of the backup AI module through the decision instruction.

According to an embodiment of the present disclosure, when the difference value of the recommendation AI module is greater than a threshold value and less than the difference value of the backup AI module, the main controller performs a machine learning training or a deep learning training on the recommendation AI module by transmitting the feedback signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
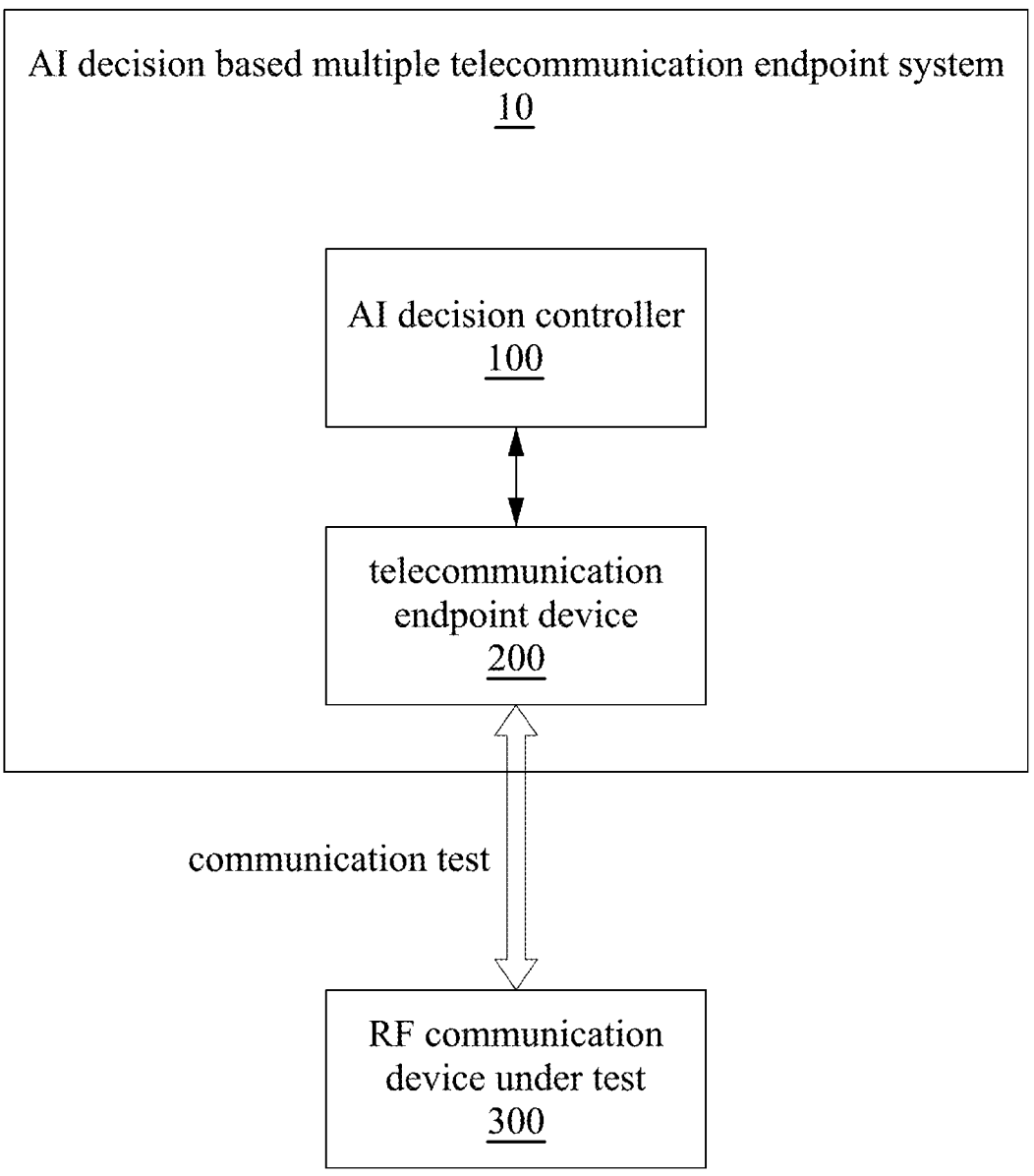
FIG. 1 is a schematic view of the architecture of the AI decision based multiple telecommunication endpoint system according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

In view of the above-mentioned technical problems, the present disclosure develops an AI decision based multiple telecommunication endpoint system and testing method, which uses AI to control the multiple telecommunication endpoint system and simulates a large number of user equipment with artificial intelligence and related behaviors.

In order to explain the implementation of the present disclosure more clearly, reference is made to FIG. 1 which is a schematic view of the architecture of an AI decision based multiple telecommunication endpoint system according to an embodiment of the present disclosure. As shown in FIG. 1, the present disclosure provides the AI decision based multiple telecommunication endpoint system 10, the multiple telecommunication endpoint system 10 includes a telecommunication endpoint device 200 and an artificial intelligence (AI) decision controller 100. The telecommunication endpoint device 200 performs a communication test with at least one radio frequency (RF) communication device under test 300. The AI decision controller 100 is electrically connected to the telecommunication endpoint device 200 to control the communication test, performs an efficiency analysis on a result of the communication test, and generates a decision instruction according to a result of the efficiency analysis.

The term "RF communication device under test 300" mentioned above includes but is not limited to 4G base station (e.g., E-UTRAN NodeB, eNB) or 5G base station (e.g., gNB), discrete unit (DU), remote radio head (RRH) or remote radio unit (RRU), small cell, femto cell, pico cell, virtual base station, satellite base station, or any other type of interface connection device in the telecommunication wireless environment.

There may be several telecommunication endpoint devices 200 around the RF communication device under test 300, the telecommunication endpoint devices 200 are configured according to the pre-defined coordinates and angles. The RF communication device under test 300 and the telecommunication endpoint device 200 can perform data transmission and testing in a wireless manner.

Figure 2:
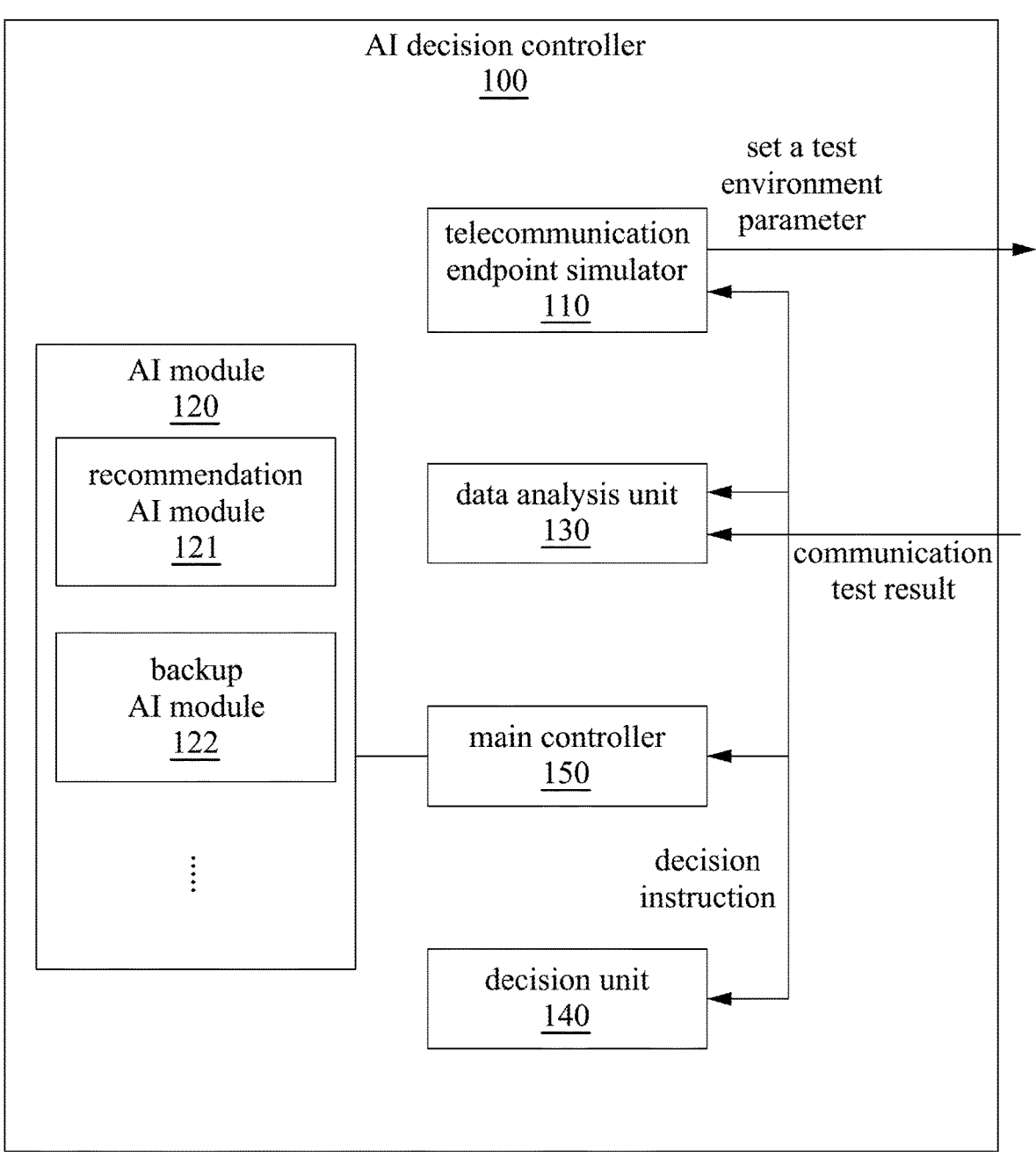
FIG. 2 is a schematic view of the architecture of the AI decision controller of the AI decision based multiple telecommunication endpoint system according to an embodiment of the present disclosure.

Reference is made to FIG. 2. FIG. 2 is a schematic view of the architecture of the AI decision controller of the AI decision based multiple telecommunication endpoint system according to an embodiment of the present disclosure. As shown in FIG. 2, the AI decision controller includes a telecommunication endpoint simulator 110, a plurality of AI modules 120, a data analysis unit 130, a decision unit 140, and a main controller 150. The telecommunication endpoint simulator 110, the AI modules 120, the data analysis unit 130, the decision unit 140, and the main controller 150 are implemented by a processor.

The telecommunication endpoint simulator 110 sets a test environment parameter of the telecommunication endpoint device 200, and the telecommunication endpoint device 200 generates a test signal corresponds to the test environment parameter.

The AI modules 120 include a configuration of a recommendation AI module 121 and a backup AI module 122, and the configuration corresponds to the test environment parameter. Each of the AI modules generates a prediction signal corresponding to the test environment parameter respectively.

The AI modules 120 can be a machine learning module pool, which serves as a logical storage area for storing and reading the optional machine learning modules, as well as monitoring and storing the characteristic parameters and usage restrictions of each module and the performance results demonstrated in each environment. The AI modules 120 can also be a deep learning module pool, which serves as a logical storage area for storing and reading optional deep learning modules, as well as monitoring and storing each module, usage restrictions, and display effectiveness of the results in each environment.

The data analysis unit 130 performs the efficiency analysis by comparing a feedback signal and each of the prediction signals. The feedback signal is transmitted by the RF communication device under test 300, and the prediction signals are generated by the AI modules 120.

The data analysis unit 130 can store and select the test environment, and perform real-time/non-real-time test analysis of the test results according to the test environment parameters, behaviors, and targets. Under the control of the main controller 150. The data analysis unit 130 further controlled by the main controller 150 to provide the start signals and stop signals of the test analysis.

The decision unit 140 generates the decision instruction according to a difference value of each of the prediction signal and the feedback signal so as to adjust the configuration of the AI modules.

When the decision unit 140 communicates with the telecommunication endpoint device 200, generates the weight value adjustment of the AI module in the process, performs the replacement of the AI module according to the recommendations and performance, and ensures a smooth, reversible and high availability replacement process.

The difference value, for example, can be the difference between the signal strength, the signal-to-interference ratio, the signal attenuation speed, or the throughput between the predicted signal and the feedback signal to evaluate the performance of the RF communication device under test 300.

The main controller 150 is electrically connected to the telecommunication endpoint simulator 110, the AI modules 120, the data analysis unit 130, and the decision unit 140. The main controller 150 controls the operation of the AI decision controller 100, provides related data, monitors reversible and high availability of the system, and performs data transmission, management, and presentation with user and the telecommunication endpoint device 200.

The hardware specifications and interfaces composed of the AI decision controller 100, for example, the AI decision controller 100 can be composed of a server platform using a complex instruction set including CPU, memory, hard disk, and motherboard.

In other embodiment, the AI decision controller 100 includes a local virtual machine or a cloud virtual machine, and provides the same computing ability and computing delay as mentioned above, and has an interface for signal transmission with the telecommunication endpoint device 200.

In other embodiment, the AI decision controller 100 includes a hardware structure having the same computing ability and computing delay. The hardware structure may be an ARM system using the advanced RISC machine or other combination of embedded system. In other embodiment, the AI decision controller 100 further includes hardware with AI analysis acceleration, for example, tensor processing unit (TPU).

The interface of the AI decision controller 100 may include a connection interface expansion module with multi-interface connection capabilities, such as 1G/10G/25G/40G/ 100G/400G wired network expansion card, 802.11g, 802.11n, 802.11ac, 802.11ax or other connection interfaces based on optical transmission, electrical transmission, quantum transmission or sound wave. In other embodiment, the interface of the AI decision controller 100 may include network acceleration modules, such as network acceleration cards or network expansion cards. This will greatly reduce equipment hardware costs and maintenance costs.

In one embodiment of the present disclosure, the telecommunication endpoint device 200 is an user equipment or an internet of thing device.

The telecommunication endpoint device 200 is not limited to the user equipment and the internet of thing device. For example, the telecommunication endpoint device 200 may be other types of devices with authorized RF bandwidth or unauthorized RF bandwidth set by any country, other types of devices in a wireless telecommunication environment, and combination of other types of telecommunication RF units such as software radio sent by field programmable logic gate array, embedded system with mobile communication chip or vehicle telematics system with 5G communication module.

Figure 3:
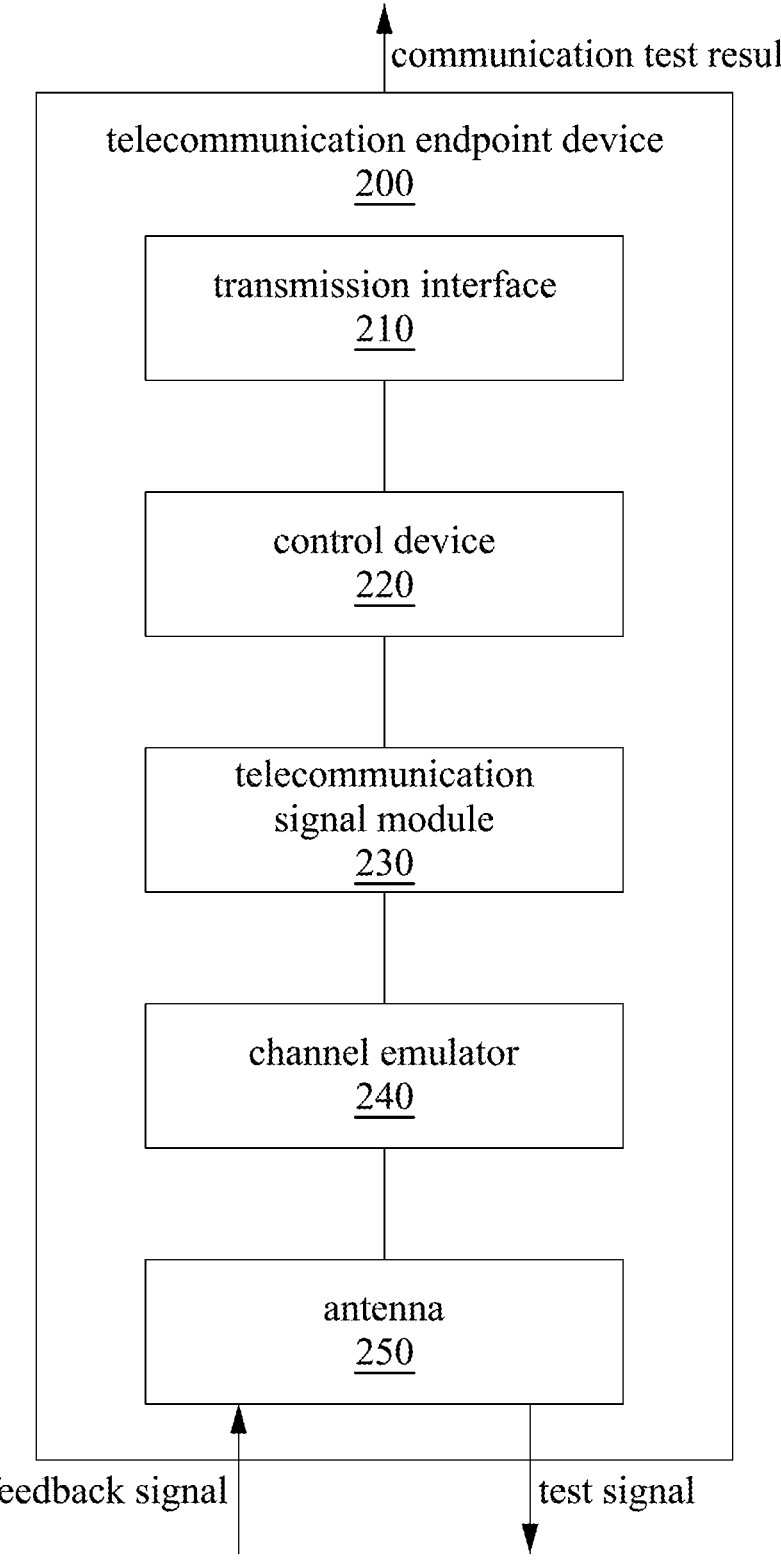
FIG. 3 is a schematic view of the telecommunication endpoint device of the AI decision based multiple telecommunication endpoint system according to an embodiment of the present disclosure.

Reference is made to FIG. 3 which is a schematic view of the telecommunication endpoint device of the AI decision based multiple telecommunication endpoint system according to an embodiment of the present disclosure. As shown in FIG. 3, the telecommunication endpoint device includes a transmission interface 210, a channel emulator 240, a telecommunication signal module 230, an antenna 250, and a control device 220. The telecommunication signal module 230 is implemented by a processor.

The telecommunication endpoint device 200, the telecommunication signal module 230, and the transmission interface 210 are selectively connected to one or multiple antenna, and are selectively connected to the channel emulator 240 or the antenna 250. Different from the traditional simulation test system, the AI decision based multiple telecommunication endpoint system 10 provided by the embodiment of the present disclosure can not only transmit and receive signals from multiple telecommunication endpoints via each single antenna, but also can automatic training in the same test environment and generate the same or different number of telecommunication endpoint tests based on the recommendations and adjustments of the AI decision controller 100.

The telecommunications terminal device 200 changes information with the AI decision controller 100, and generates signals corresponding to the telecommunications terminal device 200 according to the selected test environment. The AI decision controller 100 receives the data from the telecommunications terminal device 200, analyzes and test data, and presents the test data to the AI decision controller 100.

The telecommunication endpoint device 200 and the AI decision controller 100 are connected by a wired or wireless interface, and a control command transmission channel with authentication and encryption is generated between the telecommunication endpoint device 200 and the AI decision controller 100. After the channel is established, the initial calibration phase, the test phase, and the recovery phase are executed in sequence.

In the initialization phase, the messages exchanged between the telecommunications terminal device 200 and the AI decision controller 100 include time synchronization information, antenna location information, and telecommunication parameter settings related to the telecommunications terminal device 200, and extraction and reporting, and replacement and installation of AI module information is obtained from the AI decision controller 100.

In the space-time synchronization phase, the telecommunications terminal device 200 and the AI decision controller 100 use precision time protocol (PTP) or GPS synchronization mode to ensure that the time synchronization meets the requirements of the test environment, and provide signal transmission of the control command as follows:

Control plane standard connection signal combination: The telecommunications terminal device 200 conducts a standard control plane connection with a specified number of antennas and terminal devices. The transmitted control message includes the connection version, related control plane parameters, and expected data fields to be collected.

Control plane customized connection signal: The telecommunications terminal device 200 uses a specified number of antennas and terminal devices to perform nonstandard control plane connections, including headers or contents of packets with process differences or errors. The transmitted control message includes the connection version, related control plane parameters, and expected data fields to be collected. The telecommunications terminal device 200 generates corresponding control signals according to the results of the interactive transmission of information with the artificial intelligence decision controller 100, and reports the real-time information and results of the AI decision controller 100 in sequence.

Data of the specified type of the data plane: The telecommunications terminal device 200 uses the specified number of antennas and terminal devices to connect to the data plane that meets the standard. The transmitted data plane message includes the data type, relevant data plane parameters, and expected data fields to be collected.

Customized category data of the data plane: The telecommunications terminal device 200 connects with the specified number of antennas and terminal devices that are not in compliance with the standard data plane. The transmitted data plane message includes data content, related data plane parameters, and expected data fields to be collected, etc. The telecommunications terminal device 200 sequentially generates corresponding data plane signals according to the results of the interactive transmission of information with the artificial intelligence decision controller 100, and sequentially reports the real-time information and results of the AI decision controller 100.

Other telecommunications wireless signals with specified frequencies and contents: The telecommunications terminal device 200 uses specified antennas and terminal devices to generate other telecommunications wireless signals with specified frequencies and contents. The data transmitted includes but not limited to partial or adjusted frequency, phase, amplitude or modulation data.

According to an embodiment of the present disclosure, the test environment parameter of the telecommunication endpoint device 200 includes at least a time synchronization signal and a location signal.

The test environment parameters may represent different conditions such as whether the test field is indoor or outdoor, urban or rural, maritime or mountain area, the length of the test, and so on.

According to an embodiment of the present disclosure, the decision instruction, generated by the decision unit 140, includes a weight value for adjusting the AI modules 120.

According to an embodiment of the present disclosure, when the difference value of the recommendation AI module 121 is less than a threshold value, the data analysis unit 140 maintains the configuration of each of the AI modules.

According to an embodiment of the present disclosure, when the difference value of the recommendation AI module 121 is greater than a threshold value and the difference value of the backup AI module 122 is less than the threshold value, the data analysis unit 140 increases the weight value of the backup AI module 122 through the decision instruction.

Taking the AI module for predicting signal strength as an example. The current AI module includes the configuration of the recommendation AI module 121 and the backup AI module 122 in operation. The system obtains the recommendation AI module 121 of the past moving average at time T to predict the average and trend of model errors, and the backup AI module 122 obtains the average and trend of forecast model errors of the past moving average at time T.

Theoretically, the recommendation AI module 121 is operating, and the most appropriate module selection should be judged by the last replacement mechanism. However, due to changes in time, environment, or test methods, the accuracy of different modules also changes. Therefore, when the average error of the recommendation AI module 121 and the average error of the backup AI module 122 are similar, but the error trend of the recommendation AI module 121 gradually enlarges, and the error trend of the backup AI module 122 gradually decreases, the replacement module will select modules with a decreasing error trend based on the relationship of continuity, and start to convert the backup AI module 122 to operate at time T+1, and the recommendation AI module 121 would become the backup module.

According to an embodiment of the present disclosure, when the difference value of the recommendation AI module 121 is greater than a threshold value and less than the difference value of the backup AI module 122, the main controller 150 performs a machine learning training or a deep learning training on the recommendation AI module by transmitting the feedback signal.

The threshold value may preset as 10%, when the difference between the feedback signal, predicted by the recommendation AI module 121, and the test signal exceeds 10%, the decision unit 140 must find a suitable backup AI module 122 and increase the weight value. However, if the difference value of each backup AI module 122 is greater than the difference value of the recommendation AI module 121, which means that the existing AI module cannot accurately predict the feedback signal of this communication test, so it is necessary to use the feedback signal to execute machine learning training or deep learning training as a preset configuration of the recommendation AI module 121 and the backup AI module 122 in the same test environment next time.

Figure 4A:
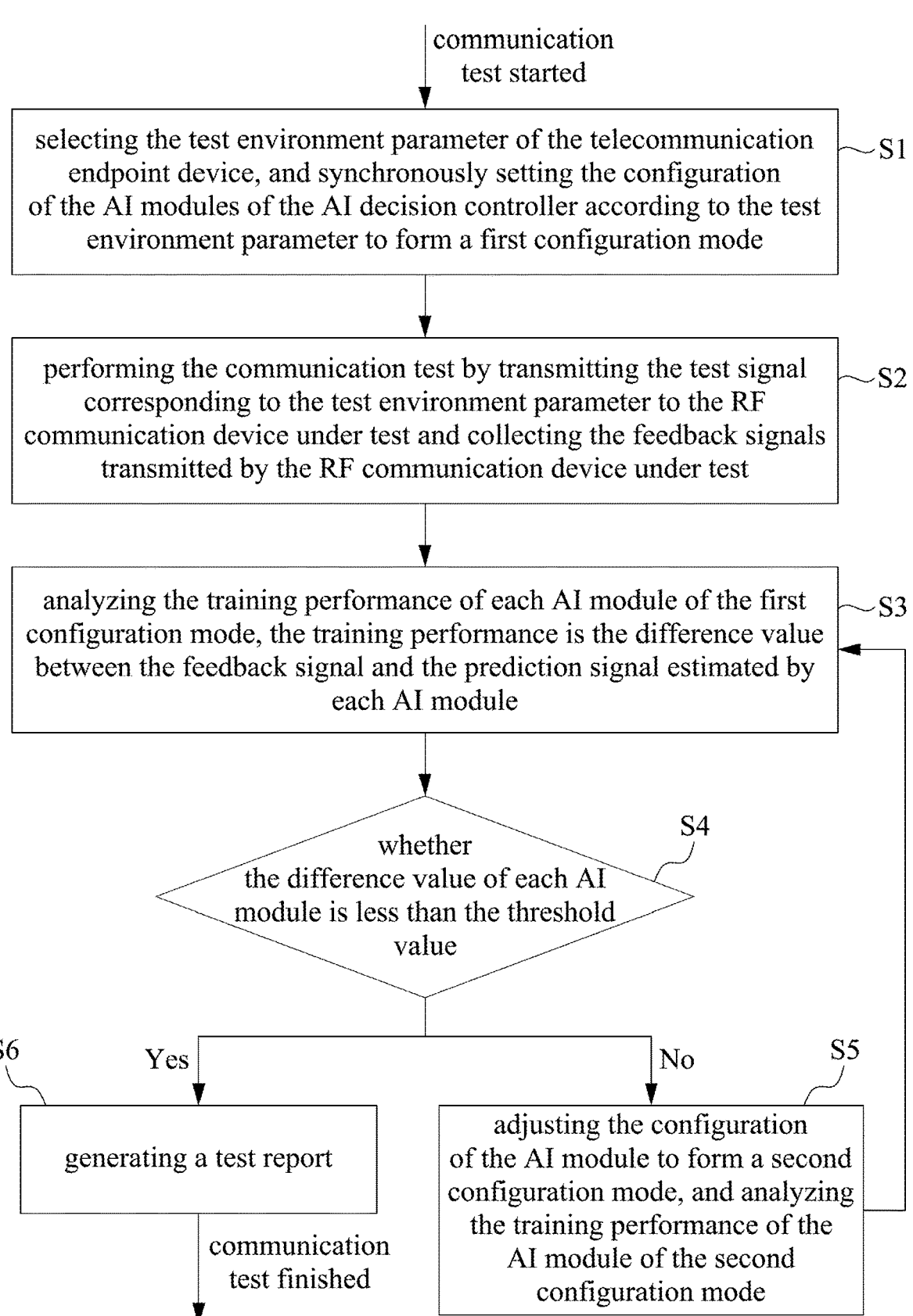
FIG. 4A is a flowchart if the telecommunication testing method of the AI decision based multiple telecommunication endpoint system.

Reference is made to FIG. 4A which is a flowchart if the telecommunication testing method of the AI decision based multiple telecommunication endpoint system. As shown in FIG. 4A, the telecommunication testing method includes the following steps.

In step S1, the test environment parameter of the telecommunication endpoint device 200 is selected, and the configuration of the AI modules 120 of the AI decision controller 100 is synchronously set according to the test environment parameter to form a first configuration mode which includes at least a configuration of a first recommendation AI module 121 and a configuration of a first backup AI module 122.

In step S2, the communication test is performed by transmitting the test signal corresponding to the test environment parameter to the RF communication device under test 300 and collecting the feedback signals transmitted by the RF communication device under test 300.

In step S3, the training performance of each AI module 120 of the first configuration mode is analyzed. The training performance is the difference value between the feedback signal and the prediction signal estimated by each AI module 120.

In step S4, whether the difference value of each AI module 120 is less than the threshold value is determined.

In step S5, when the difference value of the first recommendation AI module 121 is greater than the threshold, adjusting the configuration of the AI module 120 to form a second configuration mode, and then the training performance of the AI module 120 of the second configuration mode is analyzed.

According to an embodiment of the present disclosure, the telecommunication testing method further includes step 6: when the difference value of the first recommendation AI module 121 is less than the threshold value, a test report corresponding to the test environment parameter is generated, and the communication test is finished.

Step 1 to step 6 may be repeated under different test environment such as set up the telecommunications terminal device 200 and the RF communication device under test 300 in a non-reflective laboratory, an anechoic chamber or a specific field until the needed test data are collected.

Figure 4B:
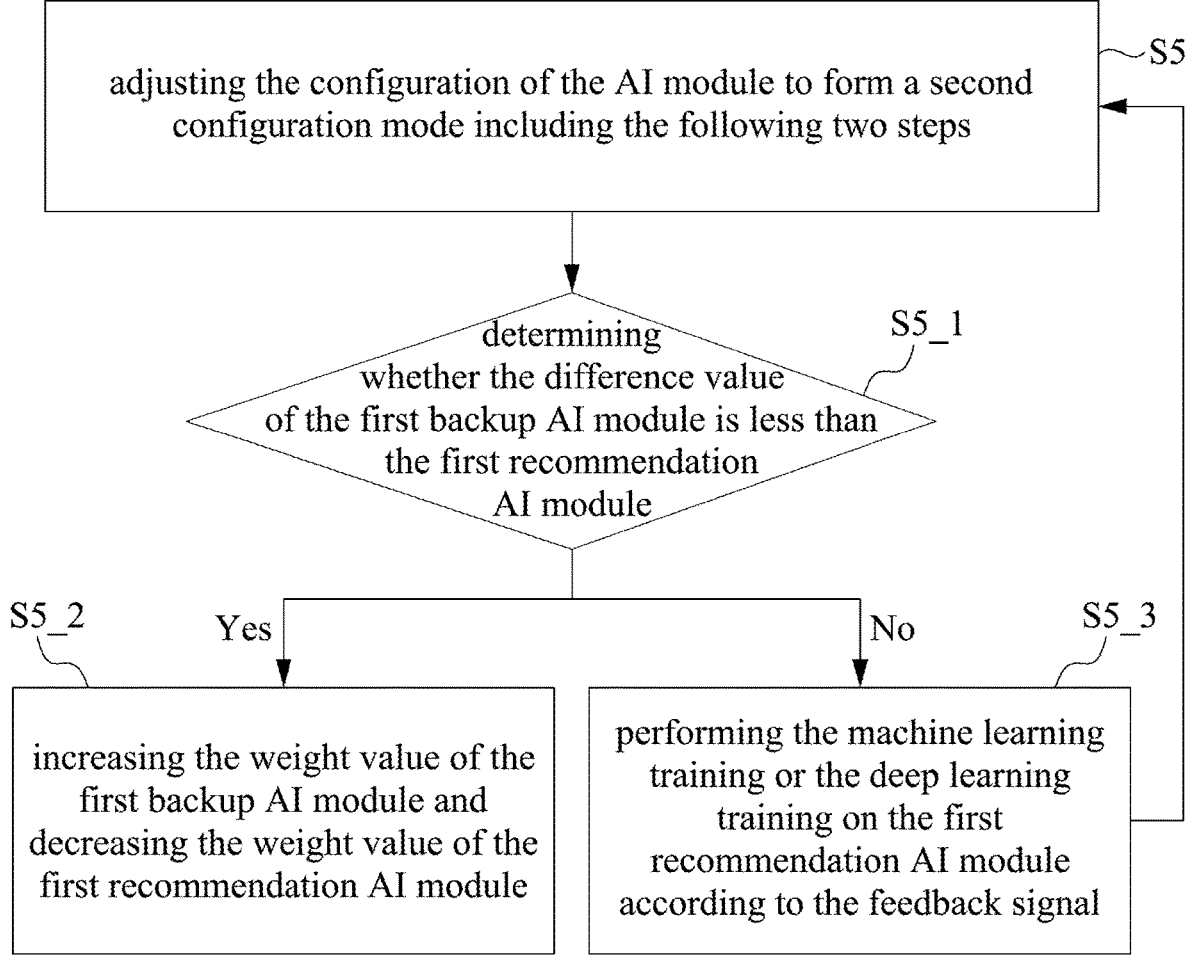
FIG. 4B is a flowchart of adjusting the configuration of AI modules according to the AI decision based multiple telecommunication endpoint system of the present disclosure.

Reference is made to FIG. 4B which is a flowchart of adjusting the configuration of AI modules according to the AI decision based multiple telecommunication endpoint system of the present disclosure. As shown in FIG. 4B, adjusting the configuration of the AI module 120 further includes step 5_1: determining whether the difference value of the first backup AI module 122 is less than the first recommendation AI module 121.

According to an embodiment of the present disclosure, adjusting the configuration of the AI module 120 further includes step 5_2: when the difference value of the first backup AI module is less than the difference value of the first recommendation AI module, increasing the weight value of the first backup AI module 122 to form the second configuration mode corresponding to the second recommendation AI module 121. The step 5_2 further includes decreasing the weight value of the first recommendation AI module 121 to form the second configuration mode corresponding to the second backup Ai module 122.

According to an embodiment of the present disclosure, adjusting the configuration of the AI module 120 includes maintaining the weight value of each AI module 120 when the difference value of the backup AI module 122 is greater than the difference value of the recommendation AI module 121.

According to an embodiment of the present disclosure, adjusting the configuration of the AI module 120 further includes step 5_3: performing the machine learning training or the deep learning training on the first recommendation AI module 121 according to the feedback signal.

According to an embodiment of the present disclosure, the telecommunications terminal device 200 controls the signals transmitted by the antenna 250 to simulate vertical application device for wireless signal transmission, so that the RF communication device under test 300 is recognized as the movement behavior of the vertical application device, or by the combination of the signals transmitted by the antennas 250 in the multiple telecommunication endpoint devices 200, the RF communication device under test 300 can identify simulated devices that are different from each antenna 250 for transmission.

In summary, different from the traditional simulation test system, the multiple telecommunication endpoint device 200 provided by the present disclosure can transmit and receive signals via each antenna 250 of the telecommunication endpoint device 200, so that the RF communication device under test 300 can recognize the telecommunication endpoint device 200 as multiple devices and perform transmission with the telecommunication endpoint device 200.

Through the training and suggestions of the AI decision controller 100, the automatic training parameter adjustment of the AI module is used to arrange and combine the signal transmission process of the antenna 250 of multiple telecommunication endpoint devices 200, while simulating wireless signal transmission for the same device, the RF communication device under test 300 can be identified as the device is moving, or through the combination of the signals transmitted by multiple telecommunication endpoint devices 200, so that the RF communication device under test 300 can recognize the simulation that the location of each telecommunication endpoint device 200 is different.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An artificial intelligence (AI) decision controller, comprising:
  a telecommunication endpoint simulator, being configured to set a test environment parameter of a telecommunication endpoint device, the telecommunication endpoint device generates a test signal corresponding to the test environment parameter;
  a plurality of AI modules, comprising a configuration of a recommendation AI module and a backup AI module, the configuration corresponding to the test environment parameter, wherein each of the AI modules generates a prediction signal corresponding to the test environment parameter respectively;
  a data analysis unit, being configured to perform an efficiency analysis on a result of a communication test by comparing a feedback signal and each of the prediction signal, the communication test being performed by the telecommunication endpoint device and at least one radio frequency (RF) communication device under test, the prediction signal corresponding to the configuration, the feedback signal being transmitted by the at least one RF communication device under test;
  a decision unit, being configured to generate a decision instruction according to a difference value of each of the prediction signal and the feedback signal so as to adjust the configuration; and
  a main controller, being electrically connected to the telecommunication endpoint simulator, the AI modules, the data analysis unit, and the decision unit.

2. The AI decision controller of claim 1, wherein at least one of the telecommunication endpoint simulator, the AI modules, data analysis unit, decision unit, and main controller is implemented by a processor.

3. The AI decision controller of claim 1, wherein the telecommunication endpoint device is one of a user equipment, an internet of things (IoT) device, a software radio device, and a system platform for transmitting a RF signal.

4. The AI decision controller of claim 3, wherein the telecommunication endpoint device comprises a control device, a transmission interface, a telecommunication signal module, a channel emulator, and an antenna.

5. The AI decision controller of claim 1, wherein the test environment parameter of the telecommunication endpoint device comprises at least a time synchronization signal and a location signal.

6. The AI decision controller of claim 1, wherein the decision instruction, generated by the decision unit, comprises a weight value for adjusting the AI modules.

7. The AI decision controller of claim 6, wherein when the difference value of the recommendation AI module is less than a threshold value, the data analysis unit maintains the configuration.

8. The AI decision controller of claim 6, wherein when the difference value of the recommendation AI module is greater than a threshold value and the difference value of the backup AI module is less than the threshold value, the data analysis unit increases the weight value of the backup AI module through the decision instruction.

9. The AI decision controller of claim 6, wherein when the difference value of the recommendation AI module is greater than a threshold value and less than the difference value of the backup AI module, the main controller performs a machine learning training or a deep learning training on the recommendation AI module by transmitting the feedback signal.

10. An artificial intelligence (AI) decision based multiple telecommunication endpoints system, comprising:
  a telecommunication endpoint device being configured to perform a communication test with at least one radio frequency (RF) communication device under test; and
  an AI decision controller being electrically connected to the telecommunication endpoint device to control the communication test, performing an efficiency analysis on a result of the communication test, and generating a decision instruction according to a result of the efficiency analysis, the AI decision controller comprising:
  a telecommunication endpoint simulator, configured to set a test environment parameter of a telecommunication endpoint device, the telecommunication endpoint device generating a test signal corresponding to the test environment parameter;
  a plurality of AI modules which comprising a configuration of a recommendation AI module and a backup AI module, the configuration corresponding to the test environment parameter, wherein each of the AI modules generates a prediction signal corresponding to the test environment parameter respectively;
  a data analysis unit, being configured to perform the efficiency analysis by comparing a feedback signal and each of the prediction signal;
  a decision unit, being configured to generate the decision instruction according to a difference value of each of the prediction signal and the feedback signal so as to adjust the configuration; and
  a main controller, being electrically connected to the telecommunication endpoint simulator, the AI modules, the data analysis unit, and the decision unit.

11. The AI decision based multiple telecommunication endpoints system of claim 10, wherein the at least one of the telecommunication endpoint simulator, the AI modules, data analysis unit, decision unit, and main controller is implemented by a processor.

12. The AI decision based multiple telecommunication endpoints system of claim 10, wherein the test environment parameter of the telecommunication endpoint device comprises at least a time synchronization signal and a location signal.

13. The AI decision based multiple telecommunication endpoints system of claim 10, wherein the decision instruction, generated by the decision unit, comprises a weight value for adjusting the AI modules.

14. The AI decision based multiple telecommunication endpoints system of claim 13, wherein when the difference value of the recommendation AI module is less than a threshold value, the data analysis unit maintains the configuration.

15. The AI decision based multiple telecommunication endpoints system of claim 13, wherein when the difference value of the recommendation AI module is greater than a threshold value and the difference value of the backup AI module is less than the threshold value, the data analysis unit increases the weight value of the backup AI module through the decision instruction.

16. The AI decision based multiple telecommunication endpoints system of claim 13, wherein when the difference value of the recommendation AI module is greater than a threshold value and less than the difference value of the backup AI module, the main controller performs a machine learning training or a deep learning training on the recommendation AI module by transmitting the feedback signal.

\* \* \* \* \*